United States Patent [19]

Tsutsumi

[11] 4,373,432
[45] Feb. 15, 1983

[54] TOP AND BUTT TRIMMER FOR PINEAPPLES

[75] Inventor: Masato Tsutsumi, Kahului, Hi.

[73] Assignee: Maui Land & Pineapple Company, Inc., Kahului, Hi.

[21] Appl. No.: 927,132

[22] Filed: Jul. 21, 1978

[51] Int. Cl.³ .................. A23N 3/00; A23N 4/20; A23N 7/08
[52] U.S. Cl. .................................. 99/542; 99/544; 99/546; 99/636
[58] Field of Search .................. 99/540–542, 99/544, 546, 586, 635, 636, 642, 643, 550; 426/482, 484

[56] References Cited

U.S. PATENT DOCUMENTS

3,151,644 10/1964 Bainbridge et al. ............... 99/542
3,780,641 12/1973 Hole ...................................... 99/550

Primary Examiner—Philip R. Coe
Assistant Examiner—Timothy F. Simone
Attorney, Agent, or Firm—Lyon & Lyon

[57] ABSTRACT

A machine for processing pineapples, wherein the remaining blemishes and skin are trimmed from the top and butt portions of a sized and partially skinned cylinder of fruit automatically during processing through sizing, coring, and top and butt removal operations. The automatic top and butt trimming permits an increased yield of higher grade product through more precisely controlled cutting and trimming than have previously been accomplished by hand operations. Labor costs are also substantially reduced.

7 Claims, 18 Drawing Figures

TOP AND BUTT TRIMMER FOR PINEAPPLES

BACKGROUND OF THE INVENTION

The present invention relates to automatic fruit processing machinery, and more particularly to such machinery as is adapted for use in processing fresh pineapples prior to canning.

A widely used apparatus for processing fresh pineapples is known as the Ginaca machine. In this apparatus, the pineapples are conveyed through a centering head into a revolving cylindrical sizing knife which cuts away the shell or skin leaving a solid cylinder of fruit. The cylinder of fruit then enters a barrel in a sequentially indexed revolving turret and is subjected to various processing operations therein, including removal of the top and butt ends of the fruit and coring of the center portion. The fruit is then discharged from the barrel, typically with some shell or skin eyes and other blemishes remaining near both ends of the cylinder because of the tapered shape of a pineapple. At present, this remaining skin, eyes and other surface imperfections are trimmed manually with a knife. This manual operation frequently results in damage to the pineapple, thereby demanding a downgrading of the fruit to a less profitable grade, and loss of more fruit than need be removed to trim away the remaining shell and blemishes. Further, to reduce trimming labor, it is frequently a standard practice to set the Ginaca machine to cut more meat from the top and butt of the pineapple than is actually necessary, so that extensive trimming of the tapered portions is not required and therefore can be handled by only a few trimmers. Present processing methods, therefore, result in considerable waste or high labor costs and sometimes both.

Various efforts have been made to reduce the waste resulting from conventional processing methods. For example, in Farmer, U.S. Pat. No. 3,036,920, a method is disclosed for dual diameter shell removal without trimming. By this method, the shell was removed to create a fruit cylinder having a specified diameter, and if any shell and blemishes remained at either end of the fruit cylinder, that end was resized to a smaller diameter. This method has been shown not to reduce labor requirements or to improve yield. Also, efforts have recently been made to develop a contour peeler, but such efforts have thus far been unsuccessful. By this method, a spindle is inserted through the core of the pineapple to allow a peeler to peel the shell by following the contour of the fruit. The difficulty with this concept is that soft fruit, such as comprises much of the riper pineapples, tends to break apart and become damaged from the pressure exerted on the fruit by the spindle and the peeler.

SUMMARY OF THE INVENTION

According to the present invention, there is provided an apparatus for automatically trimming all or substantially all of the skin remaining skin, eyes and other blemishes from a sized cylinder of pineapple. Installed in a Ginaca or similar machine having a rotating turret and sequentially indexed processing operations are rotating knives concentric with certain barrels of the turret whereby both the top and the butt ends of a sized cylinder of fruit may be trimmed while the fruit is being processed through the machine. The amount of trim can be made more precise and therefore less wasteful than with manual trimming, and there is also less likelihood of damage to the fruit. Also, less meat need be cut from the top and butt ends of the fruit, and waste is thereby further reduced. Thus, the apparatus of the present invention can significantly reduce labor costs, increase production yields and increase the yield of higher grade fruit.

Accordingly, it is an object of the present invention to provide an automatic top and butt trimmer for fruit such as pineapples.

It is another object of the present invention to reduce labor costs by substantially eliminating the need for manual trimming of fruit such as pineapples.

It is a further object of the present invention to provide an apparatus whereby increased yields of higher grade fruit may be achieved.

These and other objects and advantages of the present invention will become apparent from the following detailed description taken in conjunction with the accompanying drawings.

DETAILED DESCRIPTION OF THE PREFERRED EMBODIMENT

Figure 1:
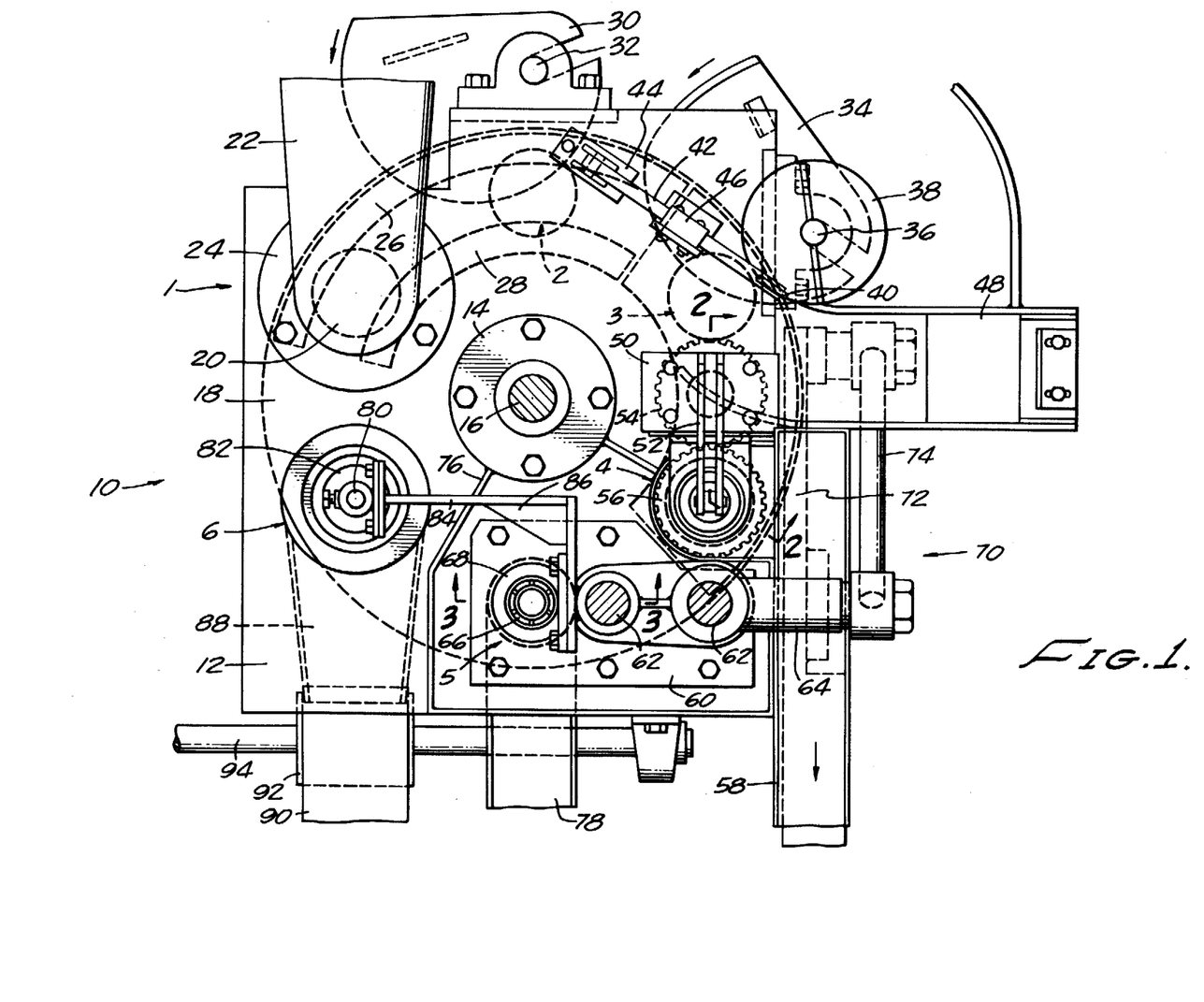
FIG. 1 is a top view of an apparatus according to the present invention, showing in dashed lines portions of the internal structure thereof.

Turning to the drawings in which like parts are identified by like reference numerals and referring initially to FIG. 1, there is illustrated a Ginaca machine 10 wherein is incorporated an apparatus for automatic top and butt trimming of pineapples according to the present invention. The machine 10 includes a top plate 12 having a bearing 14 housing a turret drive shaft 16. Mounted on the shaft 16 below the plate 12 is a Ginaca turret 18, shown in dashed lines in FIG. 1, having a plurality of barrels 20 disposed concentrically around the shaft 16. Six such barrels are illustrated in FIG. 1 and the barrels are slightly taller than the pineapples, typically having a height of approximately ten inches. Adjacent the position of each barrel, as shown in FIG. 1, is a processing station, and the turret 18 indexes sequentially in a rotating fashion about the shaft 16 so that each barrel 20 moves through all of the processing stations in a manner to be described in more detail hereinafter.

At a feed station 1 of the machine 10, a feed chute 22 is mounted on the plate 12 by a mounting bracket 24 substantially concentrically with the barrel 20 located at the station 1, through which pineapples are provided to the barrels 20 with the top facing down. Mounted below the turret 18 at the station 1 as well as at a second station to be described hereinafter are an outer guide rail 26 and an inner guide rail 28, shown in dashed lines in FIG. 1. The guide rails 26 and 28 overlap the respective outer and inner edges of the barrels 20 to support the pineapples contained therein. The distance of the guide rails 26 and 28 below the turret 18 may be adjustable.

At the top cut station 2 of the machine 10 and below and parallel with the turret 18, there is located a semicircular revolving top cut knife 30 supported on an off-center top cut knife drive shaft 32. The knife 30 is driven by a mechanism to be described hereinafter. Knife 30 moves beneath the turret, between the lower edge and the guide rails 26 and 28 such that the distance between the rails and the turret measure the width of the top cut.

At a butt cut station 3 of the machine 10, there is disposed above and parallel to the turret 18 a semicircular revolving butt cut knife 34 mounted on an off-center butt cut knife drive shaft 36. The knife 34 is driven by a mechanism to be described hereinafter. Mounted above the knife 34 and also on the shaft 36 is a circular timing cam 38 which rotates with the knife 34. Mounted upon the cam 38 is a cam follower 40, which in the illustrated embodiment is mounted upon a cam follower arm 42 attached by a shaft at the opposite end thereof to a bracket 44 mounted on the plate 12. Located between the cam follower 40 and the bracket 44 and mounted on the arm 42 is an air cylinder actuator microswitch 46 whose function will be further described hereinafter. Also mounted at the station 3 is a butt cut removal chute 48.

At a butt trim station 4 of the machine 10, there is mounted upon the plate 12 a mounting bracket 50 supporting a cylinder bracket 52 and meshed first and second gears 54 and 56, respectively, as well as further apparatus to be described hereinafter. A butt trim removal chute 58 is also disposed adjacent the station 4.

At a coring and top trim station 5 of the machine 10, a mounting bracket 60 is affixed to the top plate 12 and supports vertical guide rods 62 about which a horizontal crossarm 64 is slidably engaged. Supported by the crossarm 64 and concentric with a barrel located at the station 5 is a hollow core knife 66 slidably mounted within a core knife housing 68 which is also mounted upon the bracket 60. The crossarm 64 is connected to a crank arm 70 having a first crank arm portion 72 coupled to a second crank arm portion 74. The first crank arm portion 72 is mounted upon a drive shaft to be described hereinafter which is not illustrated in FIG. 1 because it is located directly below the crossarm 64 in the view of FIG. 1. The second crank arm portion 74 is connected to the crossarm 64. Surrounding the station 5 is an isolation fence 76 mounted on and extending upwardly from the plate 12. Disposed adjacent the station 5 is a top trim removal chute 78.

Station 6 of the machine 10 is a discharge station. Disposed above the plane of plate 12 and concentric with a barrel stopped at that station is a vertical fruit pusher rod 80 having mounted on the lower end thereof a fruit pusher 82. The rod 80 is mounted upon a right-angled crossarm 84 reinforced by an angle brace 86 and attached to the horizontal crossarm 64. Disposed below the turret 18 at station 6 is a pineapple removal chute 88 leading to a conveyor belt 90 mounted upon a conveyor pulley 92 and driven by a crank rod 94.

The feed chute 22, top cut knife 30, butt cut knife 34, core knife 66 and fruit pusher 82, together with its associated fruit pusher rod 80, are found in a conventional Ginaca machine. The modifications to the conventional Ginaca machine which comprise the subject matter of the present invention will now be described in detail.

Figure 2:
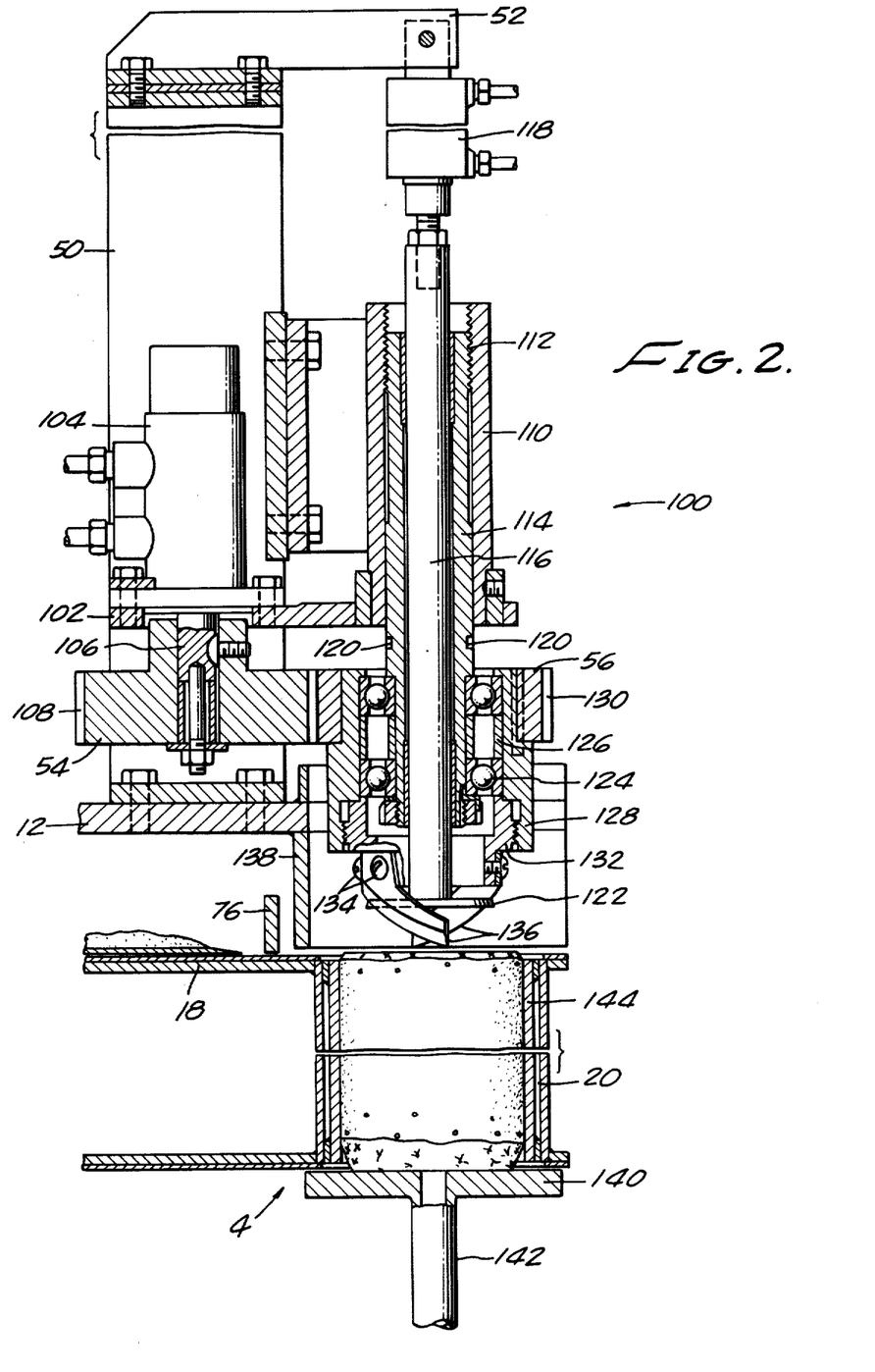
FIG. 2 is a side view in partial section, taken along the line 2—2 of FIG. 1, of a butt trimmer mechanism incorporated into the apparatus of FIG. 1.

Referring to FIG. 2, there is illustrated a butt trimmer mechanism 100 disposed above the top plate 12 of FIG. 1 at the butt trim station 4. Mounted upon the top plate 12 is the mounting bracket 50 supporting the cylinder bracket 52, both of which were illustrated in FIG. 1. The bracket 50 also supports a fruit pusher bracket 110 which carries a drive motor mount 102 upon which is mounted a trimming knife drive motor 104 which is preferably of a hydraulic type but which may be of any other type as well. The motor 104 drives the first gear 54 through a drive shaft 106. The gear 54 has conventional teeth 108. Affixed to the bracket 50 is the fruit pusher bracket 110, noted earlier, having engaged therewith by means of a knife height adjusting thread 112, a fruit pusher rod housing 114. Slidably mounted within the housing 114 is a fruit pusher rod 116 connected at its upper end to a double acting pneumatic cylinder 118, which is suspended from the cylinder bracket 52 so that the fruit pusher rod 116 is disposed concentrically above a barrel of the turret 18 when momentarily stopped at the butt trim station 4. Pusher rod 116 has a flat circular pusher plate 122 at its lowermost end. The pneumatic cylinder 118 is supplied with pressurized air at appropriate time intervals in a manner to be described hereinafter. Located at an accessible portion of the fruit pusher rod housing 114 are knife height adjusting holes 120 for receiving a spanner wrench or the like, whereby the position of the housing 114 may be adjusted through the knife height adjusting thread 112 with respect to the bracket 110 and the fruit pusher rod 116. By this means, the position of the trimmer knives with respect to the turret 18 may be adjusted, thus varying the depth of the trim as will be described in more detail hereinafter.

Rotatably engaged on bearings 124 about the housing 114, the bearings being separated by bearing spacers 126, is a knife holder housing 128 affixed to the second gear 56, the gear 56 having teeth 130 which mesh with the teeth 108 of the first gear 54. Threadably engaged with the knife holder housing 128 is a knife holder 132 having affixed thereon, by fastener means such as bolts 134, butt trimmer knives 136. The knives 136 are rotatable about the fruit pusher rod housing 114 and are concentric with a barrel momentarily stopped at the station 4, and thus actuation of the trimming knife drive motor 104 will cause the knives 136 to rotate through engagement of the teeth 108 and 130 of the gears 54 and 56, respectively. Surrounding the knives 136 is a trim retainer fence 138 which retains the trimmed portions of the pineapples within the area of the knives 136 for removal via chute 58. Adjacent the trim retainer fence 138 is a portion of the previously described isolation fence 76.

Disposed adjacent the underside of the turret 18 and aligned with the butt trimming mechanism 100 is a circular flat plate 140, acting as a seal, having an air inlet tube 142 connected thereto for lifting the fruit and thus presenting it to the trimming knives, as will be more completely explained as the entire operation is set forth hereinafter. Also, the barrels may be provided with a sizing sleeve 144 which may be utilized if necessary to accommodate pineapples of a smaller diameter than the inside diameter of the barrel.

Figure 3:
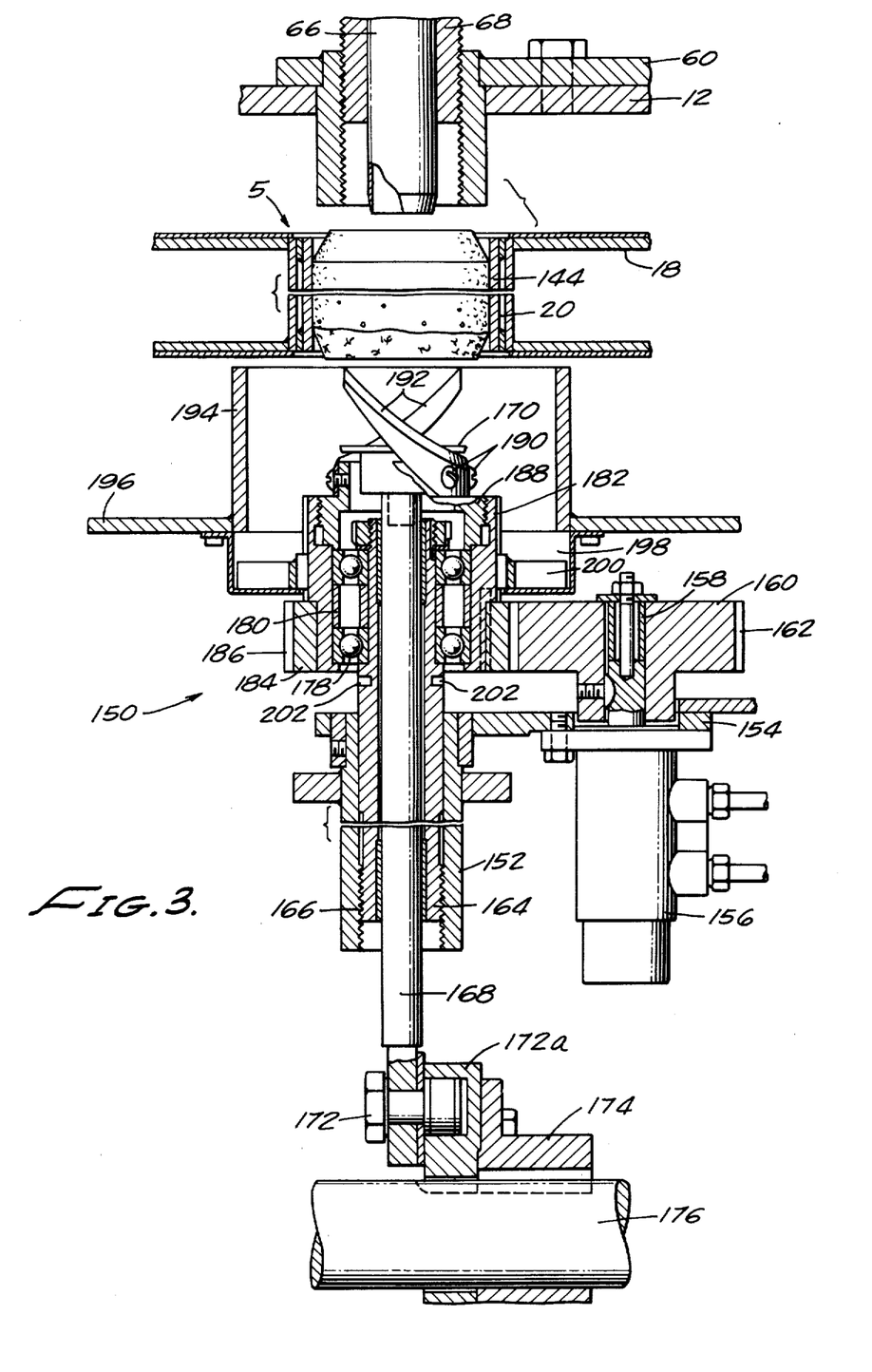
FIG. 3 is a side view in partial section, taken along the line 3—3 of FIG. 1, of a top trimmer mechanism incorporated into the apparatus of FIG. 1.

Referring next to FIG. 3, there is illustrated a top trimmer mechanism 150 disposed below the turret 18 at station 5. It will be recalled that the top trimming mechanism is on the bottom of the apparatus because the fruit is top end down. Core knife 66 is shown mounted within the core knife housing 68, which is affixed to the mounting bracket 60 attached to the top plate 12. The top trimmer mechanism 150 is supported generally by a main bracket 152 attached to support means which are not illustrated in FIG. 3. Carried by the bracket 152 is a drive motor mount 154 supporting a trimming knife drive motor 156, which is preferably hydraulic but which may be of any other type as well. Through a drive shaft 158, the motor 156 is connected to a first gear 160 having teeth 162. Also supported by bracket 152 is a fruit pusher rod housing 164 threadably engaged with the bracket 152 by means of knife height adjusting threads 166. Slidably housed within the fruit pusher rod housing 164 is a fruit pusher rod 168 having at the upper end thereof a fruit pusher 170. The fruit pusher rod 168 is connected at its lower end to a cam follower 172 engaged with a cam 172a mounted upon a cam hub 174, which in turn is mounted upon a drive shaft 176 driven in a manner to be described hereinafter. Rotatably situation on bearings 178 about the housing 164, the bearings 178 being separated by bearing spacer 180, is a knife holder housing 182 secured to a second gear 184 having teeth 186 that mesh with the teeth 162 of the first gear 160. Threadably mounted within the knife holder housing 182 is a knife holder 188, having mounted thereon by suitable fastener means 190 and top trimmer knife blades 192. Knife blades 192 and the fruit pusher rod 168 are disposed concentrically with respect to the barrel 20 of the turret 18 at the station 5 when said barrel is properly indexed and the turret is momentarily stopped. A barrel sleeve 144 is illustrated as contained within the barrel 20 in a manner similar to that illustrated in and described with respect to FIG. 2.

A trim retainer housing 194 surrounds the blades 192 for retaining pineapple trim material for removal by the top trimming chute 78. The trim retainer housing 194 is mounted above an intermediate plate 196 of the machine 10, and mounted below the plate 196 and supported thereby is a trim receiving pan 198 for receiving top trim. Affixed to the knife holder housing 182 and rotatable therewith are trim deflecting blades 200 which may be in the form of paddles extending radially from the housing 182, to assist in deflecting the trim material toward the removal chute and preventing a buildup of material within the housing.

In an accessible portion of the fruit pusher rod housing 164, there are provided knife height adjusting holes 202 for receiving a spanner wrench or the like, whereby the relative position of the fruit pusher rod housing 164 may be adjusted with respect to the bracket 152 and the fruit pusher rod 168 by means of the knife height adjusting thread 166. By this means, the position of the knives 192 with respect to the turret 18 may be adjusted, thus varying the depth of trim. Actuation of the trimming knife drive motor 156 drives the trimmer knives 192 through the intermeshed teeth 162 and 186 of the gears 160 and 184, respectively.

Figures 4, 5, 6, 7:
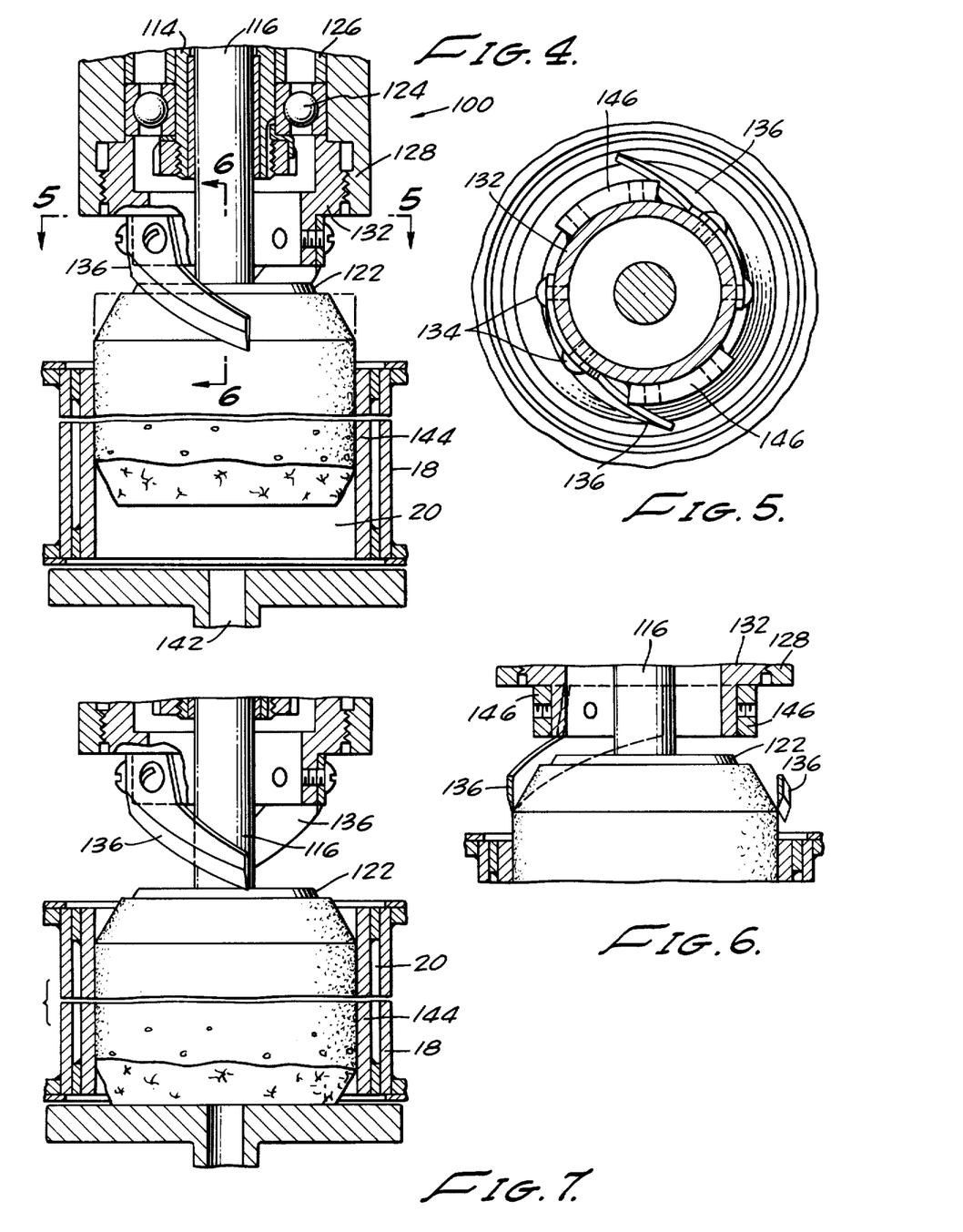
FIG. 4 is a side view as in FIG. 2 showing detail of the knife structure associated with the butt trimmer mechanism and the positioning of a pineapple thereagainst for trimming the butt end thereof.
FIG. 5 is a top view of the knife structure shown in FIG. 4, taken along the line 5—5 of FIG. 4.
FIG. 6 is another side view showing detail of the knife structure associated with the butt trimmer mechanism, taken at right angles to the view of FIG. 4, along the line 6—6 of FIG. 4.
FIG. 7 is a side view as in FIG. 4 illustrating the position of the pineapple as it is returned to the turret barrel after completion of trimming of the butt end thereof.

Referring next to FIGS. 4 through 7, there is illustrated further detail of the structure and operation of the butt trimmer mechanism 100. In FIG. 4, a pineapple is shown forced upwardly and partly out of the barrel 20 by the injection into the barrel 20 of a large amount of relatively low pressure air, such as air at approximately 5 psi, from the air inlet tube 142. The injected air forces the pineapple upwardly until the top thereof contacts the fruit pusher 122, which acts as an indexing stop. In this location, the butt end of the pineapple, which is facing upward in the barrel 20, encounters the butt trimmer blades 136 which trim the butt end of the pineapple to a beveled shape.

The shape of the butt trimmer knives 136 is better illustrated in the top view of FIG. 5, from which it is apparent that the blade surfaces of the knives 136 follow the shape of a partial conical section in order to achieve the beveled shape of the butt end of the pineapple, while at the same time providing an angular cutting edge which passes through the fruit in a slicing manner rather than chopping, thereby reducing trimming damage to soft fruit. Auxiliary knife mounting blocks 146 are provided on the knife holder 132, whereby the distance between the knives 136 may be increased to accommodate pineapples of a larger size. When pineapples of a larger size are being processed, the barrel sleeve 144 of FIG. 2, which is also illustrated in FIG. 4, is removed from the barrel 20. In this manner, the barrel 20 and the circle of rotation of the knives 136 may be adjusted to accommodate both size 2T pineapples, having a nominal sized diameter of 3⅛ inches, as well as a size 2½ pineapple, having a nominal sized diameter of 3¾ inches.

FIG. 6 illustrates from a side view the partial conical orientation of the knife blades 136. As is clearly illustrated in FIG. 6, the body of each knife 136 is vertical, and only the blade thereof actually comes in contact with the pineapple. The blade therefore describes a partial conical shape in space, the precise shape being determined by the desired amount of meat to be trimmed from the butt end of the pineapple.

FIG. 7 illustrates the manner in which the trimmed pineapple is returned to the barrel 20 for further processing. The fruit pusher rod 116 is extended in accordance with a control discipline to be described hereinafter, forcing the fruit pusher 122 against the butt end of the pineapple and thereby forcing the pineapple back into the barrel 20. The supply of air pressure by which the pineapple was lifted in the barrel 20 during the trimming operation is exhausted by seepage from the barrel 20.

Figures 8, 9, 10, 11:
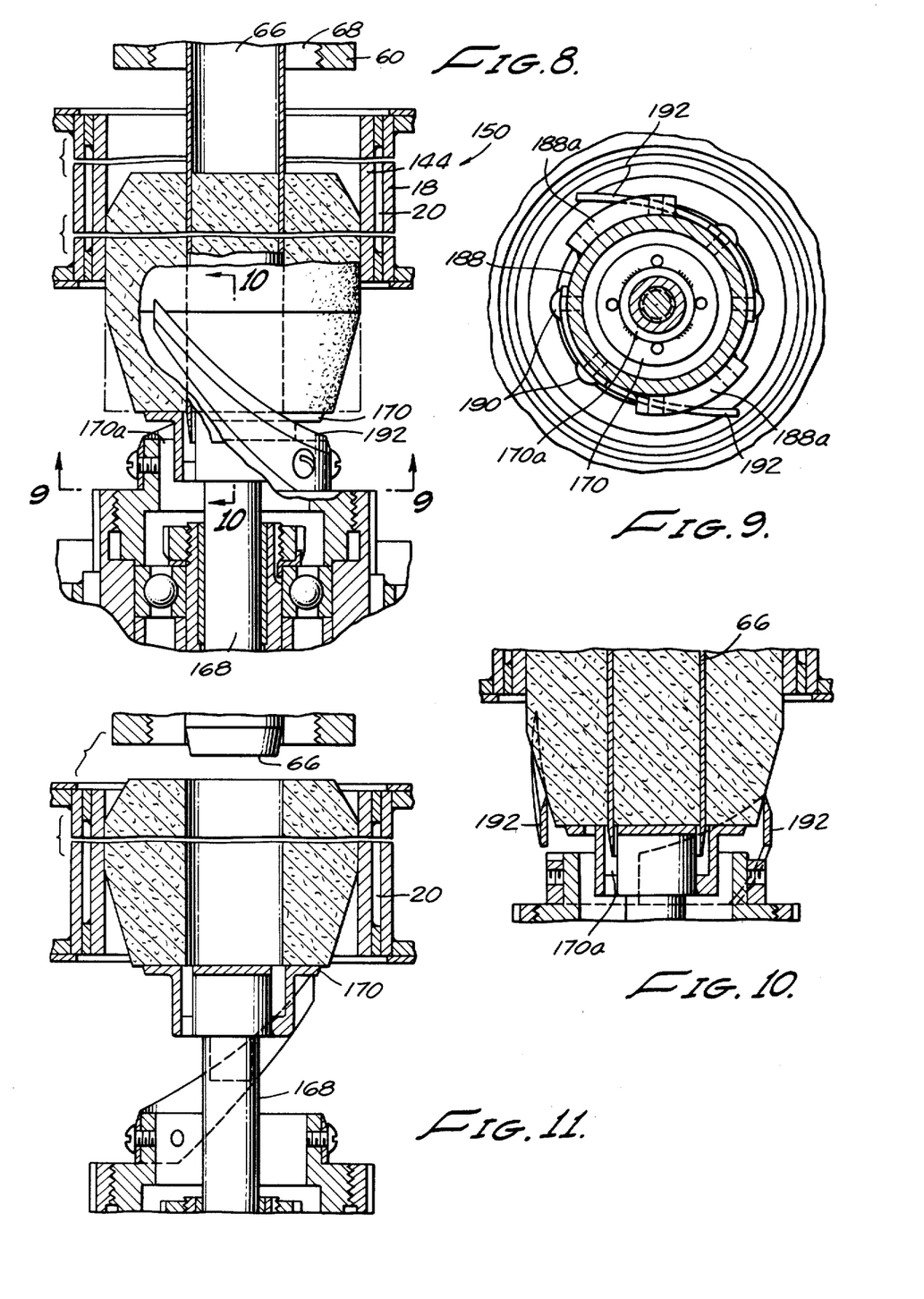
FIG. 8 is a side view as in FIG. 3 showing detail of the knife structure associated with the top trimmer mechanism and the positioning of a pineapple thereagainst for trimming the top end thereof.
FIG. 9 is a bottom view of the knife structure shown in FIG. 8, taken along the line 9—9 of FIG. 8.
FIG. 10 is another side view showing detail of the knife structure associated with the top trimmer mechanism, taken at right angles to the view of FIG. 8 along the line 10—10 of FIG. 8.
FIG. 11 is a side view as in FIG. 8 illustrating the position of the pineapple as it is returned to the turret barrel after completion of trimming of the top end and removal of the core.

In FIGS. 8 through 11, the top trimmer mechanism 150 is illustrated in a manner analogous to the illustration of the butt trimmer mechanism 100 in FIGS. 4 through 7. In FIG. 8, a pineapple situated in a barrel 20 at the coring and top trim station 5 is shown being cored and trimmed at its top end. The core knife 66 is forced through the core of the pineapple by means to be described hereinafter, forcing the pineapple against the fruit pusher 170, which acts as an indexing stop to limit the downward movement of the pineapple. As is illustrated in FIG. 8, there is provided in the fruit pusher 170 an annular recess 170a into which the hollow core knife 66 may extend to insure that the core is completely cut. Resting against the fully retracted fruit pusher 170, the top end of the pineapple is then trimmed by the rotating top trimming knives 192, which are shaped similar to the butt trimming knives 136 except that they generally achieve a greater depth and angle of cut into the pineapple because the top end of the pineapple is generally more tapered than the butt end.

In FIG. 9, the partial conical shape of the top trimmer knives 192 is illustrated. Also illustrated are auxiliary knife mounting blocks 188a mounted on the knife holder 188 whereby the distance between the knives 192 may be increased by mounting the knives 192 on the blocks 188a with fasteners 190 to accommodate pineapples of a larger diameter. As with the butt trimmer mechanism described earlier, the barrel sleeve 144 would also be removed from the barrel 20 to accommodate the larger pineapples.

In FIG. 10, as in the previously discussed FIG. 6, it is illustrated that the body of each top trimmer knife 192 is essentially vertical so that only the cutting edge thereof actually contacts the pineapple to trim the top to a beveled shape. Also illustrated in more detail in FIG. 10 is the annular gap 170a in the fruit pusher 170 into which the core knife 66 extends to insure that the core of the pineapple is completely cut out.

In FIG. 11, the fruit pusher 170 and fruit pusher rod 168 are shown extended by means of the cam arrangement to be more fully described hereinafter. The extension of this fruit pusher 170, as controlled by the cam, allows the pusher to receive the fruit in the barrel, lower it in synchronization with downward movement of the core knife and then return it to the barrel 20. At the same time, the core knife 66 is withdrawn from the pineapple to the illustrated position above the barrel 20.

Figure 12:
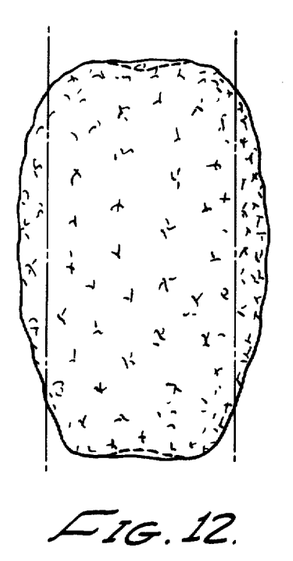
FIGS. 12 through 17 represent diagrammatic side views of a pineapple, illustrating the shape thereof after processing through the sequential operations performed by the apparatus described herein. The pineapple is shown top end down, as that is its standard position during processing through the apparatus.
Figure 13:
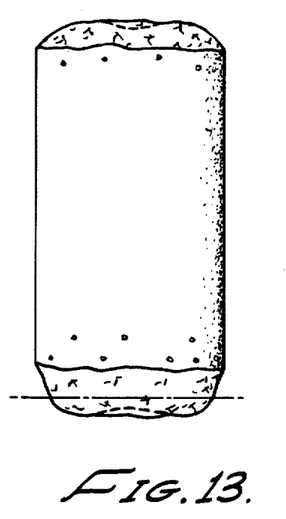
Figure 14:
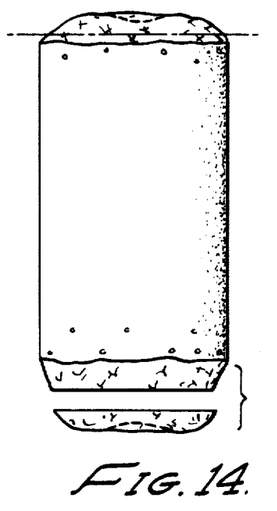
Figure 15:
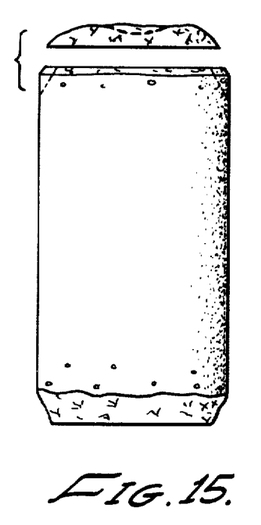

FIGS. 12 through 17 illustrate the shape of a pineapple after processing through each successive station of the above-described apparatus. FIG. 12 illustrates in a downward facing position a pineapple whose leaves have been removed and which is ready to be processed through the above-described apparatus. The vertical dashed lines of FIG. 12 indicate the portions of the pineapple shell that are removed by a sizing device, not illustrated previously, before the pineapple enters the barrel 20 located at the feed station 1 through the feed chute 22. FIG. 13 illustrates the shape of the sized pineapple at the feed station 1, the horizontal dashed line thereon indicating the location of the top cut to be made by the revolving knife 30 at the top cut station 2. FIG. 14 illustrates the shape of the pineapple after the top cut has been completed, the horizontal dashed line thereon indicating the position of the butt cut to be made by the revolving knife 34 at the butt cut station 3. FIG. 15 indicates the shape of the pineapple after the butt cut has been made at the butt cut station 3.

Figure 16:
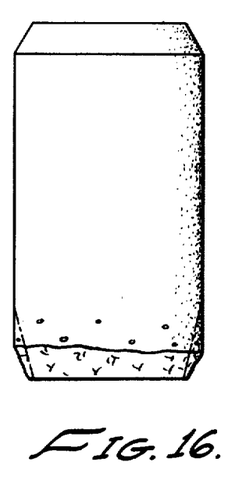
Figure 17:
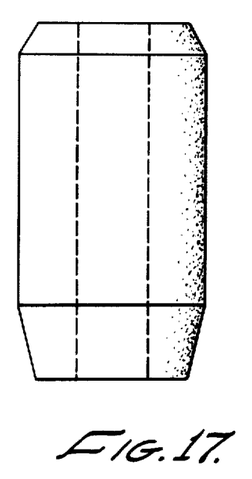

All of the foregoing processing steps plus the subsequent coring step are performed by conventional Ginaca machines. As discussed previously, a pineapple shaped as in FIG. 15, but without a core, presently is delivered to an assembly line for manual trimming of the remaining shell and blemishes from the butt end and top end areas. FIGS. 16 and 17 illustrate the results achieved by the apparatus of the present invention when incorporated into a conventional Ginaca machine. Referring first to FIG. 15, the dashed lines thereon at the corners of the butt end of the pineapple illustrate the approximate location of the butt trim to be performed by the butt trimmer mechanism 100 at the butt trim station 4. In FIG. 16, the pineapple is illustrated after the butt end thereof has been trimmed of excess shell and blemishes to a beveled shape by the butt trimmer mechanism 100. The dashed lines on either side of the top end of the pineapple shown in FIG. 16 illustrate the approximate location of the top trim to be made by the top trimmer mechanism 150 at the coring and top trim station 5. In FIG. 17, the pineapple is illustrated after the top thereof has been trimmed of excess shell and blemishes by the top trimmer mechanism 150, and the core has been removed by the core knife 66. In most cases, the pineapples as shown in FIG. 17 will be ready for processing into bulk pack without the need for further manual trimming operations.

Figure 18:
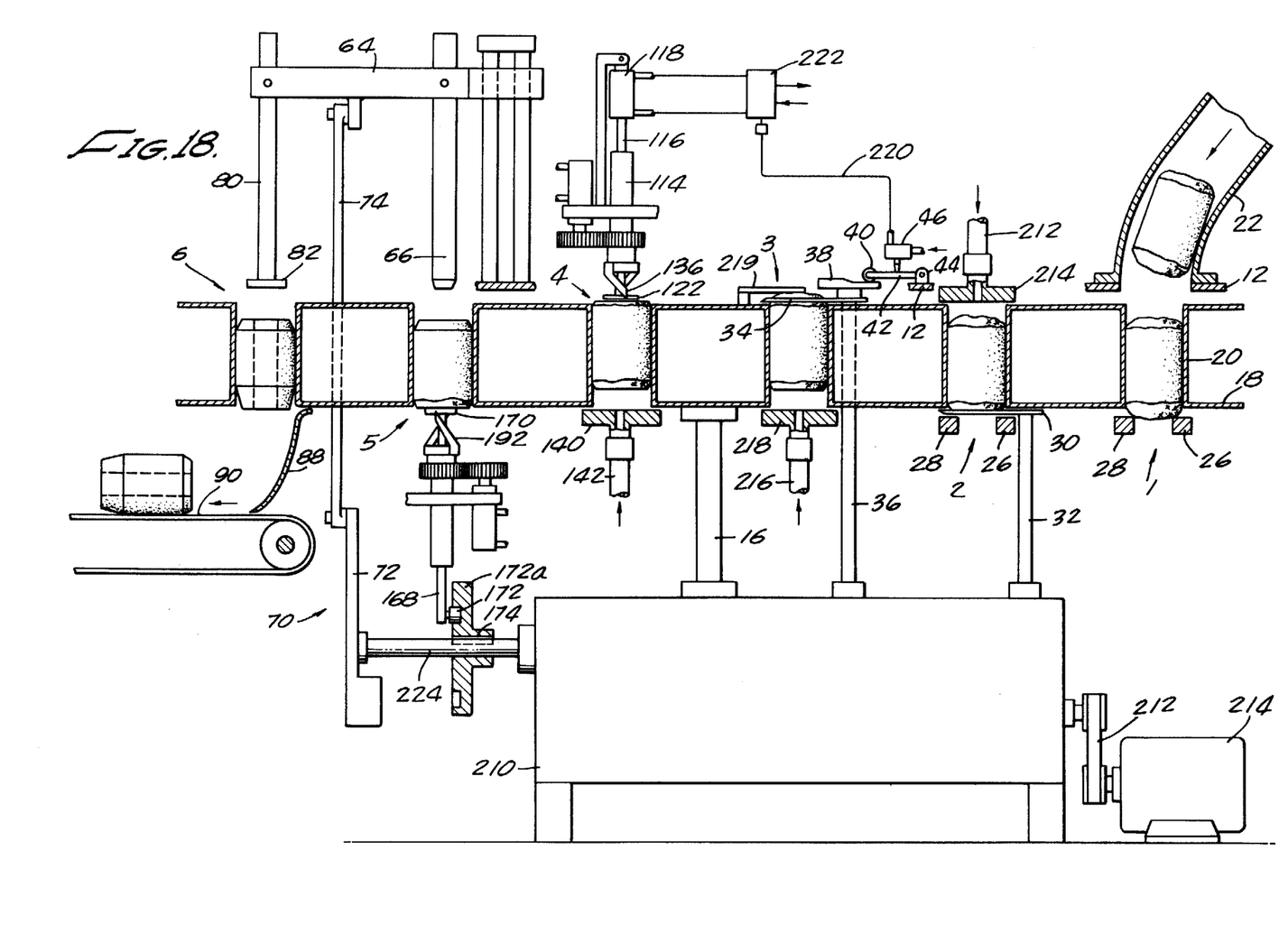
FIG. 18 is a diagrammatic illustration of the apparatus of FIG. 1 in which the circularly oriented barrels of the turret have been unfolded and are shown in a linear orientation for ease of illustration and explanation of the processing functions occurring at each station, and for illustration of the drive and control mechanisms.

In FIG. 18, there is illustrated in diagrammatic form a linear representation of the successive processing steps carried out by the apparatus of the present invention, together with the means by which motive force is imparted to the apparatus and the control devices associated with the device. The turret 18 is sequentially indexed in a rotating manner so that each barrel 20 of the turret 18 passes through each processing station in turn. The rotational movement is imparted to the turret 18 through the turret drive shaft 16 by a conventional gear mechanism 210, known in the trade as a "Ferguson drive". The Ferguson drive 210 is powered through a pulley and belt arrangement 212 by an electric motor 214. Various other operations within the apparatus of the present invention are also controlled by the Ferguson drive 210, as will be explained hereinafter.

A pineapple is provided, top down, to the barrel 20 at the feed station 1 through the feed chute 22 mounted upon the top plate 12. The pineapples have previously been sized by a sizing apparatus well known in the art and not illustrated herein. The sizing apparatus centers the fruit in the feed chute 22 and cuts and removes the skin from the central portion thereof, leaving the pineapple with a cylindrical central portion having a diameter which fits snugly into the barrel 20 yet readily slidable therein. In the barrel 20 at the feed station 1, the pineapple thus slides of its own weight until it encounters the outer and inner guide rails 26 and 28, respectively, whose distance below the bottom of the turret 18 is adjustable as previously described to permit a preselected amount of the top end of the pineapple to protrude from the barrel 20.

The Ferguson drive 210 then indexes the turret so that the barrel 20 containing the pineapple is located at the top cut station 2. At this station, the pineapple is gently forced against the guide rails 26 and 28 by the injection into the barrel 20 of a large amount of relatively low pressure air, such as air at approximately 5 psi, from an air inlet tube 212 attached to a circular flat plate 214, acting as a seal, adjacent the top of the barrel 20 at the station 2. In a timed sequence determined by the internal gearing of the Ferguson drive 210, the revolving top cut knife 30 then slices across the top end of the pineapple to remove the top therefrom. The cut top is delivered elsewhere for further processing by transfer means not illustrated. Because the revolving knife 30 is mounted off-center on the drive shaft 32, which is driven by the Ferguson drive 210, the cutting edge of the knife 30 actually describes a spiral line in space, so that the cutting is performed in a smooth, slicing action rather than a cutting or chopping motion in order not to damage soft pineapples. The low pressure air escapes naturally when the turret 18 next begins to index.

The turret 18 is then indexed by the Ferguson drive 210 to the butt cut station 3. At this station, a large amount of relatively low pressure air, such as air at approximately 5 psi, is injected into the barrel 20 through an air inlet tube 216 connected to a circular flat plate 218, acting as a seal, mounted adjacent the bottom of the turret 18. The pineapple is thereby forced upwardly in the barrel 20 until it encounters an indexing stop 219, whose position with respect to the top of the turret 18 may be adjustable to permit a preselected amount of the butt end of the pineapple to protrude from the barrel 20. As previously discussed in connection with the top cut at the station 2, the revolving butt cut knife 34, mounted off-center on a drive shaft 36 driven by the Ferguson drive 210, then slices across the butt end of the pineapples, removing the butt end therefrom to be delivered for further processing by the removal chute 48. Again, as soon as the turret 18 next indexes, the low pressure air escapes naturally from the barrel 20.

Also as previously described in connection with FIG. 1, a cam 38 is mounted upon the drive shaft 36 and drives a cam follower 40 mounted on a cam follower arm 42, the other end of which is pivotally mounted on a bracket 44 mounted on the top plate 12. Responsive to the motion of the cam follower 40 as it rides upon the cam 38 is an air cylinder actuator 46, which controls an air distributor 222. When the actuator 46 is opened to permit air to pass therethrough, the air is directed by a conduit 220 to the air distributor 222 which distributes air in and out of the double acting pneumatic cylinder 118, as will be described hereinafter.

When the turret 18 is indexed by the Ferguson drive 210 to the butt trim station 4, a large volume of relatively low pressure air, such as air at approximately 5 psi, is injected into the barrel 20 through the air inlet tube 142 mounted on the circular flat plate 140, acting as a seal, which is disposed adjacent the bottom of the turret 18. The pineapple is thus forced against the fruit pusher 122, which acts as an indexing stop to limit the upward movement of the pineapple. In this position, the butt end of the pineapple is trimmed by the butt trimmer knives 136 to a beveled shape determined by the particular orientation of the knives, and the trim is delivered for further processing by the butt trim removal chute 58. As in the case of the top cut and the butt cut performed by the revolving knives 30 and 34, respectively, the previously described design of the butt trim knives 136 allows the knives to impart a slicing action to the butt end of the pineapple rather than a cutting or chopping action, to lessen the possibility of damage to soft pineapples. The amount of butt trim may be increased or decreased by moving the knives up and down with respect to the fruit pusher 122. This is accomplished by turning the rod housing 114 so that the knife height adjusting threads 112 will cause the housing 114 and the associated knives 136 to change position with respect to the bracket 110 and the fixed fruit pusher 122, and also with respect to the turret 18.

In a timed sequence controlled by the shape and rotation of the timing cam 38 and the consequent activation of the air cylinder actuator 46, and synchronized with the rotation of the turret 18, the pneumatic cylinder 118 is next activated by the air distributor 222 to force the fruit pusher rod 116 and thus the fruit pusher 122 downwardly, forcing the pineapple back into the barrel 20. The pneumatic cylinder 118 is then actuated by the air distributor 222 in the opposite direction, causing the fruit pusher rod 116 and the fruit pusher 122 to retract. The pneumatic cylinder 118 exerts a pressure of approximately 40 psi, easily overcoming and exhausting the low pressure air remaining in the barrel 20 from the injection of air through the air inlet tube 142.

The turret 18 is then indexed by the Ferguson drive 210 so that the barrel 20 is located at the coring and top trim station 5. The operations at this station are controlled by a crank shaft 224 driven by the Ferguson drive, on which are mounted the crank arm 70 described in FIG. 1, comprising a first crank arm portion 72 coupled to a second crank arm portion 74, and the cam hub 174 illustrated in FIG. 3, on which are mounted the fruit pusher cam 172a and cam follower 172. Connected to the cam follower 172 is the fruit pusher rod 168 on the upper end of which is mounted the fruit pusher 170.

The fruit pusher cam 172a is asymmetrically shaped so that the fruit pusher 170 and fruit pusher rod 168 have a long dwell time in the "up" position; that is, in the position whereby a pineapple is returned to or supported in the barrel 20 at the station 5. The fruit pusher is in the up position shown in FIG. 19 when the next pineapple filled barrel reaches station 5 so that it will not initially fall down into the trimming knives. The fruit pusher 170 is in the up position when the crank arm 70 causes the core knife 66 to thrust into the core of the pineapple. The core knife 66 imparts an added measure of rigidity to the pineapple during the top trimming process, in addition to that supplied by the barrel 20, to help prevent soft fruit from breaking apart. As the fruit pusher rod 168 and the core knife 66 move downward together, under the respective influences of the cam follower 172 and the crank arm 70 connected to the horizontal crossarm 64, the pineapple is lowered into the rotating top trimming knives 192 and the top thereof is trimmed by the knives 192 in a slicing manner analogous to that previously described. The trim is delivered for further processing by the top trim removal chute 78. After the top of the pineapple has been trimmed, the fruit pusher rod 168 and consequently the fruit pusher 170, as well as the core knife 66, move upward together until the pineapple is returned to the barrel 20. The core knife 66 then continues to move upward until it is removed from the pineapple. The cores of successively cored pineapples collect in the hollow core knife 66 until finally emerging from the top thereof to be delivered for further processing. The fruit pusher 170, due to the asymmetrically shaped cam 172a, dwells in the "up"

position until another barrel 20 is indexed to the station 5. The knife height with respect to the fruit pusher 170 and turret 18 is adjustable as previously described for the butt trim mechanism 100, to vary the depth of trim.

The turret 18 is then indexed so that the barrel 20 containing the subject pineapple is located at the discharge station 6. At this station, the fruit ejector rod 80, which has mounted at the lower end thereof the fruit pusher 82, moves downward under the influence of the crank arm 70 attached to the cross arm 64, from which the fruit pusher rod 80 is suspended, to eject the pineapple from the barrel 20. The pineapple moves down a chute 88 and is delivered on a conveyor belt 90 for inspection and further processing.

Although in the preferred embodiment the butt trimming mechanism 100 and the top trimming mechanism 150 have each been provided with two knife blades, it has been found that satisfactory trimming may be obtained when only one knife blade is used. In addition to the adjustability in the depth of trim by adjusting the position of the knives 136 and 192 with respect to the turret 18 and the fruit pushers 122 and 170, respectively, and the ability to accommodate different sized pineapples by mounting the knives 136 and 192 on auxiliary knife mounting sleeves 146 and 188a, respectively, it is apparent that the amount of meat trimmed from the top and butt of the pineapple may also be adjusted by using differently angled knives. In initial experimental tests of the present invention, the more precise trimming achieved by the butt and top trimming knives has permitted the top cut on a size 2½ pineapple to be reduced by about ⅜ths inch, and the butt cut to be reduced by about 3/16ths inch, a total of about 9/16ths of an inch, over the respective top and butt cuts previously utilized when manual trimming of the top and butt ends of a pineapple was performed. A theoretical net gain in recovery of 2.0 percent in a size 2½ pineapple may be calculated, and 1.8 percent in a size 2T pineapple. In experimental operation side by side with a conventional production line, a yield increase of one to two cases per ton of pineapple processed has thus far been achieved and further testing of further cutting and trimming variations indicates a possibility of further yield increases. There is also an obvious saving in labor costs due to the elimination of most manual trimming.

Beyond the somewhat apparent advantages of increased per ton yield and a decrease in labor due to elimination of manual trimmers, there is an unforeseen result of the present invention. Pineapple is canned in the slice style, the chunk style and the crushed style, and all may be of premium grade, and may sell for the same price per case. These are referred to as the solid pack. It is also canned in juice which sells at a lower price. Thus, trimming labor which destroys any more of the smooth cylindrical surface than is necessary to remove inperfections, causes more of the fruit to be downgraded to juice. The present invention, by increasing the length of the cylindrical surface, and by reducing damage from careless or hurried trimmers, provides the canner with the opportunity of having more premium grade pineapple available for canning as solid pack.

While a presently preferred embodiment of the present invention has been described and illustrated, many variations and modifications thereof would be apparent to those skilled in the art, and it is intended to include all such modifications and variations within the scope of the appended claims.

I claim:

1. An improved Ginaca machine for the automatic processing of pineapples, comprising:
   a turrent rotatable about a vertical axis, said turret having at least six barrels therein;
   means for rotatably driving and indexing said turret whereby the barrels are temporarily and sequentially indexed at a plurality of processing stations;
   feed means at the first of said stations for continuously introducing cylindrically pre-sized, partially skinned pineapples into a barrel of said turret;
   first cutting means at the second of said stations for cutting an end of a pineapple, said means including a continuously rotating knife blade positioned adjacent a horizontal surface of said turret and moving parallel thereto, adjustable gauging means adjacent said turret at said station, and means for moving a pineapple cylinder in a barrel into contact with said gauging means;
   second cutting means at the third of said stations for cutting the other end of a pineapple, said means including a continuously rotating knife blade positioned adjacent the opposite horizontal surface of said turret and moving parallel thereto, adjustable gauging means adjacent said turret at said station, and means for moving a pineapple cylinder in a barrel into contact with said gauging means;
   first trimming means at the fourth of said stations for trimming remaining shell and blemishes from the corners of an end of a pineapple cylinder, said trimming means comprising a stationary trimming knife assembly including a rotating knife blade, and means for moving the pineapple cylinder in its barrel to engage said knife assembly;
   second trimming means at the fifth of said stations for trimming remaining shell and blemishes from the corners of the other end of a pineapple cylinder, said second trimming means comprising a stationary trimming knife assembly including a rotating knife blade, means for coring said pineapple cylinder, and means for moving the same into engagement with said trimming knife assembly; and
   means at the sixth of said stations for ejecting pineapple cylinders from the turret.

2. An improved Ginaca machine for the automatic processing of pineapples, comprising:
   a turret rotatable about a vertical axis, said turret having at least six barrels therein;
   means for rotatably driving and indexing said turret whereby the barrels are temporarily and sequentially indexed at a plurality of processing stations;
   feed means at the first of said stations for continuously introducing cylindrically pre-sized, partially skinned pineapples into a barrel of said turret;
   first cutting means at the second of said stations for cutting the downward-oriented end of said pineapples, said means including a continuously rotating knife blade positioned beneath said turret and moving parallel to the horizontal surface thereof, adjustable gauging means beneath said turret at said station, and means for moving a pineapple cylinder in a barrel partially downwardly into contact with said gauging means;
   second cutting means at the third of said stations for cutting the upward-oriented end of said pineapples, said means including a continuously rotating knife blade positioned above said turret and moving parallel to the horizontal surface thereof, adjustable gauging means adjacent said turret at said station, and means for moving a pineapple cylinder partially upwardly in a barrel to contact said gauging means;

first trimming means at the fourth of said stations for trimming remaining shell and blemishes from the corners of the upward-directed end of a pineapple cylinder, said trimming means comprising a stationary trimming knife assembly including at least one rotating knife blade, and means for moving a pineapple cylinder partially upwardly in a barrel to engage said knife assembly;

second trimming means at the fifth of said stations for trimming remaining shell and blemishes from the corners of the downward-directed end of a pineapple cylinder, said second trimming means comprising a stationary trimming knife assembly including at least one rotating knife blade, means for coring said pineapple cylinder, and means for moving the same partially downwardly in its barrel to engage said trimming knife assembly; and means at the sixth of said stations for ejecting pineapple cylinders from the turret.

3. The apparatus set forth in claim 2, wherein both the first and second trimming knife assemblies comprise:

at least one rotating knife blade, said blade being oriented at an angle with respect to the longitudinal axis of the pineapple cylinder whereby the path of the cutting edge describes a right circular conical frustum.

4. The apparatus of claim 3, wherein said knife blade has a cutting edge of helical form.

5. The apparatus of claim 2, wherein said second trimming knife assembly further includes adjustable gauging means to limit the extent of movement of the pineapple cylinder into said knife assembly, and means for positively moving said cylinder back into its barrel.

6. The apparatus of claim 2, wherein both the first and second trimming knife assemblies include:

adjustable gauging means to limit the extent of movement of the pineapple cylinder into said knife assembly, and means for positively moving said cylinder back into its barrel.

7. The apparatus of claim 2, wherein in said second trimming means, said coring means comprises a coring tube operative to move downwardly into a pineapple cylinder, said coring tube also thereby operative as the means for moving said cylinder downwardly into said trimming knife assembly.

* * * * *